United States Patent [19]

Horlander

[11] Patent Number: 4,700,199

[45] Date of Patent: Oct. 13, 1987

[54] PRINT QUALITY CONTROLLER FOR A THERMAL PRINTER

[75] Inventor: Frank J. Horlander, Lexington, Ky.

[73] Assignee: International Business Machines Corporation, Armonk, N.Y.

[21] Appl. No.: 793,354

[22] Filed: Oct. 31, 1985

[51] Int. Cl.[4] .............................................. G01D 15/10

[52] U.S. Cl. ................................ 346/76 PH; 400/120

[58] Field of Search ............ 346/76 PH, 1.1, 162–164; 400/120; 214/216 PH; 364/518–520; 250/317.1, 318

[56] References Cited

U.S. PATENT DOCUMENTS 4,309,712 1/1982 Iwakura ......................... 346/76 PH 4,464,669 8/1984 Sekiya et al. ................... 346/76 PH

*Primary Examiner*—Arthur G. Evans

*Attorney, Agent, or Firm*—Frank C. Leach, Jr.; John A. Brady

[57] ABSTRACT

A thermal printer has a plurality of electrodes arranged in a column for applying heat to a resistive ribbon to transfer material from the resistive ribbon to a recording medium. When the electrode is to be energized in the present cycle but was not energized in the previous cycle or either of the contiguous electrodes is not to be energized in the present cycle, additional power is applied to the electrode during a first portion of the present cycle to increase the total power applied to the electrode. This improves the print quality through enhancing the left leading edge and/or either vertical edge of the character. During a second portion of the cycle, power is applied for the same period of time to all of the electrodes, which are to be activated, during the particular cycle. The additional power applied during the first portion of the cycle is obtained through comparing stored data of the specific electrode as to its activation in the prior cycle and the stored data of the two contiguous electrodes during the particular cycle.

17 Claims, 9 Drawing Figures

PRINT QUALITY CONTROLLER FOR A THERMAL PRINTER

FIELD OF THE INVENTION

This invention relates to a thermal printer having heating elements arranged in a column for applying heat to a thermal transfer medium and, more particularly, to an apparatus for increasing the energy applied to a heating element to increase the heat when the heating element is to be activated in a cycle and it was not activated in the prior cycle or either of the adjacent heating elements is not activated in the same cycle.

DESCRIPTION OF THE PRIOR ART

In U.S. Pat. No. 4,435,634 issued to me, print electrodes, which are driven by current, cause internal heating of a resistive ribbon to transfer ink portions of the resistive ribbon to a recording medium as pels (print elements) for printing characters. The electrodes, which are arranged in a column, have the current supplied thereto increased if the electrode above it or below it is not activated in the same cycle. Current is further increased if both of these contiguous electrodes are not activated. Thus, my aforesaid patent is directed to electrodes having current supplied thereto with the total current being increased when the contiguous electrodes are not driven with the amount of the increase depending on whether one or both of the contiguous electrodes are not driven.

In my aforesaid patent, any horizontal or vertical line of a character is formed by more than one pel on the recording medium with each of the pels being produced by one of the electrodes cooperating with the resistive ribbon. For example, the horizontal bar or line of a character H would be formed by at least two pels from the same number of the electrodes. Two electrodes in the column produce the two pels forming the vertical edges of this horizontal line of the character H. It is these two electrodes, for example, that have the current increased thereto in my aforesaid patent since one of the contiguous electrodes is not activated.

Another arrangement for controlling the current supplied to an electrode is disclosed on pages 5132 to 5137 of Volume 27, No. 9 (February 1985) of the IBM Technical Disclosure Bulletin. This system uses the conditions of twelve surrounding electrodes to determine the total current supplied to an electrode during a cycle. Thus, the total current is controlled by a number of electrodes that are not contiguous to the electrode.

A further arrangement for increasing current to an electrode is described on pages 271-273 of Volume 28, No. 1 (June 1985) of the IBM Technical Disclosure Bulletin. This has the current increased at the start of each character box in which there is to be underscore. This is to increase the bonding force of the heat forming the underscore to the paper at the boundaries of the character box.

U.S. Pat. No. 4,415,908 to Sugiura relates to a thermal printer in which heat is applied to a thermal transfer medium from a thermal head during each of three heat generating time periods in each cycle. During the first time period, a first head driver heats the thermal printing head for a first period of time when a specific dot is to be produced on the recording medium. If one of the two thermal heads contiguous to the thermal head is not to be heated during the cycle, a second head driver heats the thermal head during a second time period. If the thermal head was not heated in the prior cycle, a third head driver heats the thermal head during a third time period of the cycle. Each of the dot patterns is capable of producing a horizontal or vertical line of a character by itself due to the size of each dot.

U.S. Pat. No. 4,364,063 to Anno et al is directed to a thermal recording apparatus in which thermal resistive elements, which are current driven, are disposed in a line. The period of time to which the heated thermal resistive element is subjected to current is controlled in accordance with whether the element had been heated in the prior cycle when the elements caused printing of the prior line. This is to prevent burnout of the thermal resistive element. The thermal resistive element is turned on for only the first portion of a cycle if it was turned on in the prior cycle and is turned on for both first and second portions of a cycle if it was not turned on in the previous cycle.

The foregoing prior art is directed to using electric power to heat resistors on the printhead rather than to drive current into a resistive ribbon as in the present invention. The apparatus of my aforesaid patent increases the current to a specific electrode in a column when one or both of the contiguous electrodes are not driven, but the current is still applied for the same period of time. This increased current compensates for the lightened-edge printing produced by current spreading because of current not being applied to the contiguous electrode or electrodes. This current spreading or leakage prevents the desired amount of heat to be applied to the ribbon so that a lighter dot or pel is produced.

The aforesaid Sugiura patent requires three different time periods for applying heat to the thermal transfer medium during a cycle. The print elements of the aforesaid Sugiura patent are of a size that one of the print elements can produce a horizontal or vertical line of a character. Additionally, the overall system is one in which driving immediately adjoining pels may cause excessive heat accumulation, a circumstance which is not a factor for the small, current electrodes to which this invention is directed.

The aforesaid Anno et al patent decreases the current to a thermal resistive, element when the thermal resistive element was energized in the previous cycle. If the thermal resistive element was not energized in the previous cycle, then the current stays on for a second time period. There is no recognition in the aforesaid Anno et al patent of compensating for the amount of energy applied to the thermal resistive element to control the quality of print or that print elements in a column should be compensated when they are at a character edge.

SUMMARY OF THE INVENTION

The apparatus of the present invention utilizes the application of power, which may be pulse width modulated, to increase the quality of print so that letter quality print may be obtained. This is accomplished through controlling the length of time that the power is applied to an electrode in accordance with whether the electrode produces a pel that forms a leading edge of a vertical line of a character or a vertical edge of a horizontal line of a character with at least two of the pels being required to form any horizontal or vertical line of the character.

By dividing the power application to each electrode into two portions of each cycle, power is applied in the first portion only to those electrodes that are producing pels that are leading edges and/or vertical edges of lines of a character to be printed. During the second portion of the cycle, power is applied for a longer period of time than during the first portion of the cycle to each of the electrodes activated in the present cycle.

By initially applying the power during a first portion of the cycle only to those electrodes that produce pels forming a leading and/or vertical edge of a line of a character, this increased energy causes a resistive ribbon, which includes a layer of resin filled with conductive carbon black closest to the electrode, a layer of aluminum, and a layer of ink furthest from the electrode and closest to a recording medium, to have the solid layer of ink broken. With the solid layer of ink broken by the additional power, less power is required by the adjacent electrode or the same electrode in the next cycle to transfer ink. Accordingly, this increased power in breaking the solid layer of ink of the resistive ribbon contributes to the improved print quality.

If there is no power applied to the same electrode during the prior cycle, the electrode produces a pel that is a leading edge of a vertical line of the character and has the power applied during the first portion of the present cycle in addition to the second portion of the present cycle. If the electrode above or below the electrode being activated during the present cycle is not activated in the present cycle, then the electrode forms a pel that is a vertical edge of a horizontal line of the character. If the electrode is at the top or the bottom of the column of the electrodes and is activated during the present cycle, it also will have power applied during the first portion of the cycle because it forms a pel that is a vertical edge of a horizontal line of the character.

With any of these conditions existing, the apparatus of the present invention applies increased power to the electrodes. It is the same amount of power even if the electrode was not activated in the previous cycle so that the formed pel is a leading edge of a vertical line of the character and also if one of the two contiguous electrodes is not activated in the present cycle so that the activated electrode produces a pel that is a vertical edge of a horizontal line of the character.

Therefore, increased enhancement of the leading edge and/or the vertical edge of a portion of a character to be printed by power applied to a specific electrode is obtained by the apparatus of the present invention.

A feature of this invention is to provide an apparatus for improving the print quality at a leading edge or a vertical edge of a character produced by electrodes applying heat through a thermal transfer medium.

Another feature of this invention is to provide a method an apparatus for selectively increasing power applied to an electrode when used for printing through a thermal transfer medium in which the electrodes are arranged in a column when either of the two contiguous electrodes in the column is not activated in the same cycle or the same electrode in the prior cycle was not activated.

A further feature of this invention is to provide an apparatus for controlling the power to an electrode, arranged in a column with other electrodes, for printing through a thermal transfer medium in accordance with the state of the two contiguous electrodes during the same cycle and the state of the electrode to be used for printing in the prior cycle.

Still another feature of this invention is to provide an apparatus for improving the print quality of characters produced by electrodes applying energy to a resistive ribbon.

The foregoing and other features and advantages of the invention will be apparent from the following more particular description of the preferred embodiments of the invention as illustrated in the accompanying drawings.

Figure 1:
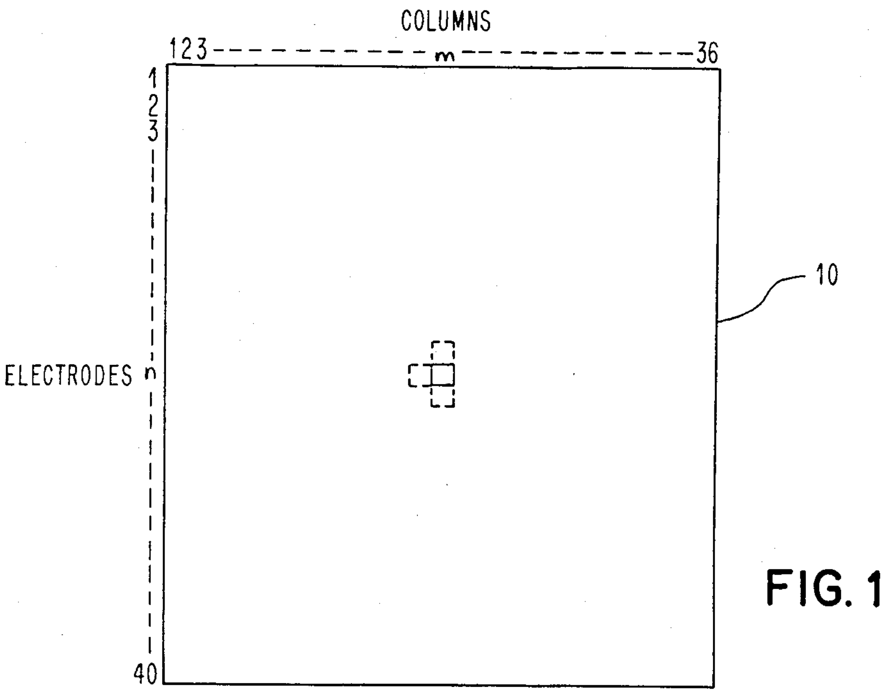
FIG. 1 is a schematic view of a character box used for printing a character by a plurality of electrodes arranged in a column and cooperating with a thermal transfer medium to transfer heat to the thermal transfer medium for printing on a recording medium.
Figure 4:
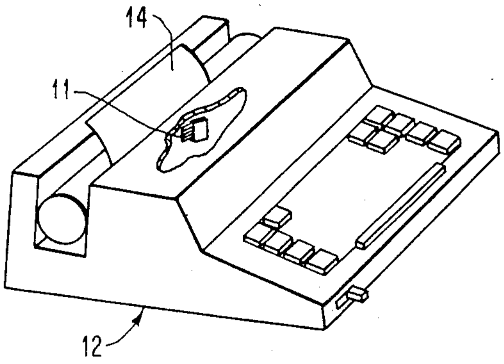
FIG. 4 is a perspective view, partly in section, of a thermal printer including electrodes arranged in a column.
Figure 5:
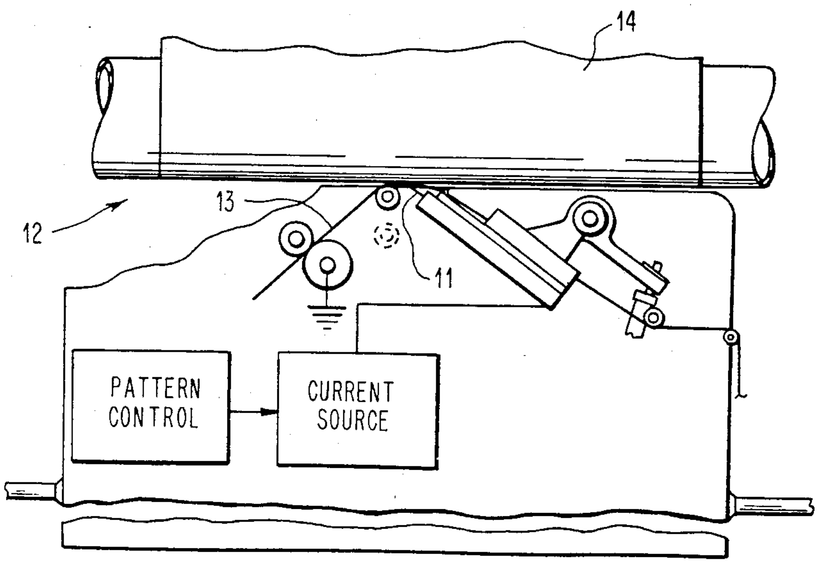
FIG. 5 is a fragmentary top plan view of a portion of the thermal printer of FIG. 4 and showing a ribbon and an electrode cooperating therewith.

Referring to the drawings and particularly FIG. 1, there is shown a character box 10. For a ten pitch character, which defines characters positioned in a box having a width of one tenth of an inch, the box 10 is divided into thirty-six vertical columns with each column having forty dot location or picture elements (pels) approximately 1/360" wide by 1/240" high. To achieve high resolution in accordance with this invention, at least two of the pels are required to form any horizontal line of the character, and at least three of the pels are required to form any vertical line of the character. Each of the forty pels is in a position at which one of forty electrodes 11 (see FIG. 4), which have an area of contact of approximately two mils square each, of a thermal printer 12 is positioned for cooperation with a thermal transfer medium 13 (see FIG. 5) such as a resistive ribbon.

The electrodes 11 are selectively energized in response to signals with at least two of the electrodes 11 being driven if any are activated when forming a vertical or horizontal line of a character. The electrodes 11 generate heat in portions of the thermal transfer medium 13 to cause marking material of the thermal transfer medium 13 to be transferred to a recording medium 14 when the marking material is softened to a flowable state by heat from the electrode 11. One example of the thermal printer 12 is more particularly shown and described in U.S. Pat. No. 4,545,693 to J. C. Bartlett et al and incorporated by reference herein.

The small size of the pels, made by selected energization of the electrodes 11, is such that letter quality print is obtained from the electrodes 11. Each pel is printed or not printed in accordance with the energization pattern.

Each electrode 11 is effective for a 1/240" height while moving laterally to effectively cover the 1/360" width of one pel during the print time assigned to one column. Certain criteria are required when using the forty electrodes 11 to obtain the letter quality print.

These criteria include the minimum weight of a horizontal line of the character is three or more pels for any length of the line and two pels when the line is less than one character with one pel being forbidden except at the end of a line which narrows to a point. The minimum weight of the vertical line is four or more of the pels for any height and three pels where the height of the vertical line is one-third the character matrix height. One or two pels is forbidden as the minimum weight of the vertical line.

The criteria for printing stand alone dots such as a period, for example, is three pels vertical by four pels horizontal. Thus, the criteria for letter quality print with the electrodes 11 requires at least two of the electrodes 11 to be energized when forming either a vertical or horizontal line of a character.

The thermal transfer medium 13 may be any suitable material for transferring printing marks to the recording medium 14 in accordance with the heat supplied from the particular energized electrodes 11. The thermal transfer medium 13 may be a conventional resistive inked ribbon. Such a resistive ribbon includes a layer of resistive resin filled with conductive carbon black closest to the electrodes 11, a layer of aluminum, and a layer of ink closest to the recording medium 14 with a release layer at least between the layers of aluminum and ink.

When a leading or vertical edge of a character is to start, a solid layer of ink in the thermal transfer medium 13 must be broken. After the solid layer of ink has been broken, less energy is required to transfer the ink with the next successive dot. Thus, the present invention increases the energy whenever it is necessary to break the solid layer of ink of the thermal transfer medium 13 at a leading and/or vertical edge of a character.

Any pel position in the character box 10 (see FIG. 1) such as the position of a pel m,n, for example, may fall at a leading edge (This is along a vertical line and has pels only to its right.) or at a vertical edge (This is along a horizontal line and has a pel only below it or above it.) of the character to be formed in the character box 10. An edge exists when any of the three contiguous pel positions associated with a print pel position is not energized. Thus, when any of the three contiguous pels to the pel m,n is not energized, it is desired to increase the power to the electrode 11 (see FIG. 4) at the position of the pel m,n (see FIG. 1). The amount of increased power is the same irrespective of whether one, two, or three of the contiguous pels is not energized.

For the pel m,n, a decision as to whether to boost the energy of the pel m,n can be expressed logically as follows:

boost energy for pel m,n = pel m,n [$\overline{\text{pel m,n}-1}+\overline{\text{pel m,n}+1}+\overline{\text{pel m}-1\text{,n}}$]. If any any of the pel m,n—1 or pel m,n+1 or pel m−1,n is deenergized, then power to the pel m,n is boosted.

The boosted power is added during a first portion of each cycle while the print power is added during a second portion of the cycle. Therefore, each print cycle is divided into a boost portion and a print portion. With each cycle of printing all the pels in a column within the character box 10 being nominally 694 microseconds, the boost portion of the cycle is 127.8 microseconds and the print portion of the cycle is 566.2 microseconds. During the print portion of the cycle, the maximum period of time that the power is applied to the electrodes 11 (see FIG. 4) is for some fraction of the 42.6 microseconds time period.

Figure 2:
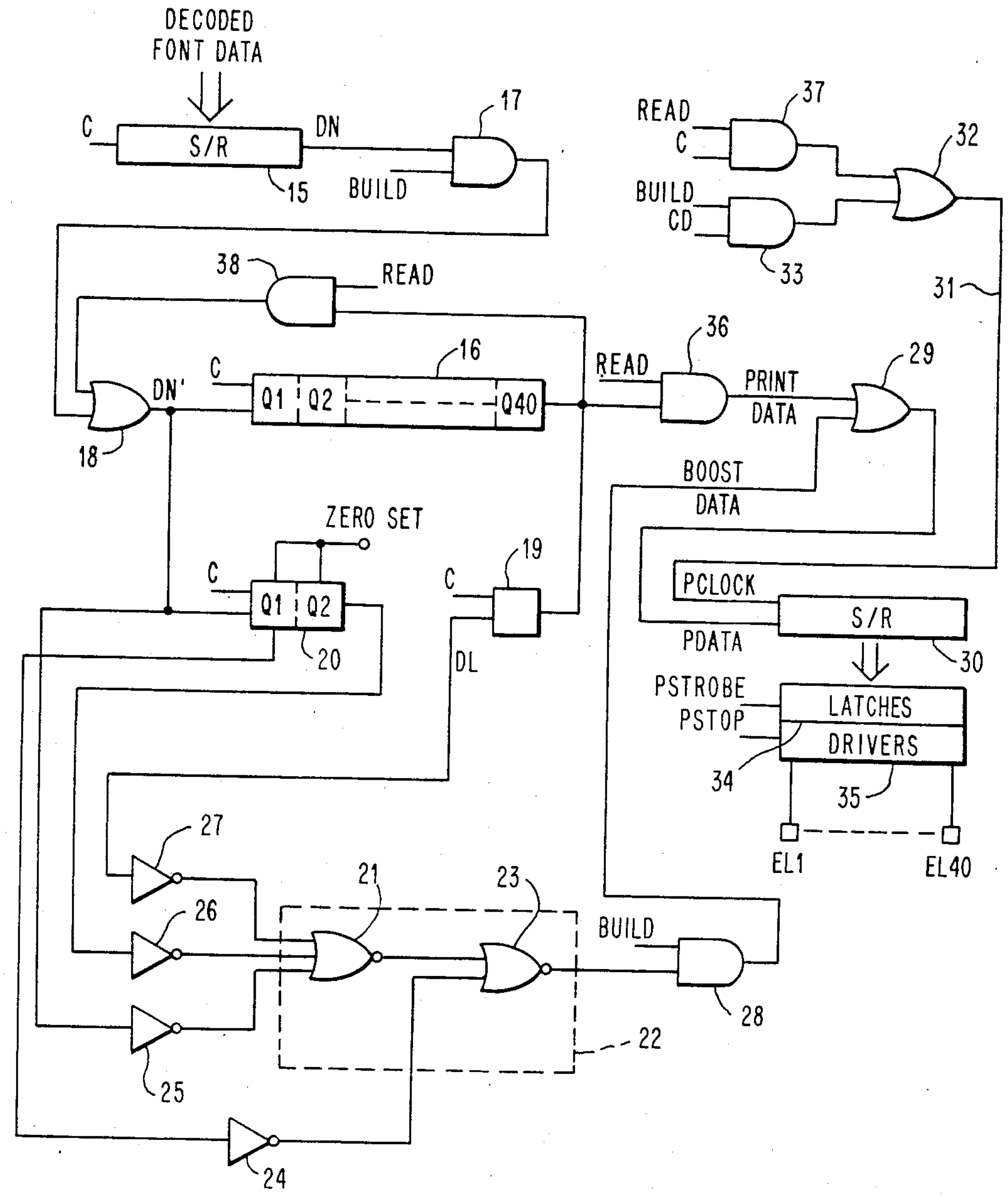
FIG. 2 is a schematic block diagram of one system for controlling the power supplied to each electrode.

One system for selectively energizing the electrodes 11 during the print portion of a cycle or the print and boost portions of a cycle is shown in FIG. 2. Decoded font data, which is compressed, for a character produced within the character box 10 (see FIG. 1) is supplied to a shift register 15 (see FIG. 2) having a width of eight bits with eight bits of data supplied in parallel.

On each negative going edge of a clock pulse C, the data in the shift register 15 is shifted serially one bit at a time as a decoded font data (DN) signal to a shift register 16, which is forty bits wide, under control of a BUILD signal. The BUILD signal is one of two inputs to an AND gate 17 with the DN signal from the shift register 15 being the other input.

The output of the AND gate 17 is supplied through an OR gate 18 having its output as the input to the shift register 16. Therefore, with the BUILD signal up as it is during the print portion of a cycle, the output of the shift register 15 is supplied serially through the OR gate 18 to the shift register 16. This output signal from the OR gate 18 is identified as DN' (the next bit to be supplied to the shift register 16).

If the bits in the shift register 16, before supply of the DN' signal to the shift register 16 occurs, are Q1 to Q40 representing forty pel positions within the character box 10 (see FIG. 1) with the Q1 bit in the shift register 16 (see FIG. 2) deemed to correspond to the pel m,n (see FIG. 1), the Q2 bit corresponds to the pel m,n−1 and the DN' signal corresponds to the pel m,n+1.

The pel m−1,n is represented by an output signal DL from a store latch 19 (see FIG. 2), which received the Q40 bit from the output of the shift register 16 when the Q1 bit was supplied as an input and stores it until the clock pulse C goes down to clock the DN' signal into the shift register 16. By storing the Q40 bit in the store latch 19 (see FIG. 2), the DL signal corresponds to the pel m−1,n (see FIG. 1).

By comparing Q2, DN', and DL, it can be determined whether any of the pel m,n−1, the pel m,n+1, and the pel m−1,n corresponding thereto has been activated. If at least one has not, then it is desired for power to be boosted to the electrode 11 (see FIG. 4) that is to apply the power to the pel m,n (see FIG. 1).

The DN' signal also is supplied as an input to a two bit shift register 20 (see FIG. 2), which has Q1 and Q2 signals stored therein and being the same Q1 and Q2 signals in the shift register 16. Thus, when tne DN' signal is clocked into the shift register 16 by the negative going edge of a clock pulse C, it also is clocked into the two stage shift register 20.

This causes the Q2 signal from the shift register 20 to be supplied as one of three inputs to a NOR gate 21, which forms part of a comparator 22. The comparator 22 includes a second NOR gate 23 having the output of the NOR gate 21 as one of its two inputs. The other input to the NOR gate 23 is a $\overline{Q1}$ signal, which is supplied through an inverter 24 from the shift register 20.

The inputs to the NOR gate 21 are $\overline{DN'}$, which is produced by an inverter 25 from the output of the OR gate 18, $\overline{Q2}$, which is produced by an inverter 26 from the output of the shift register 20, and $\overline{DL}$, which is produced by an inverter 27 from the store latch 19. If any of these three inputs to the NOR gate 21 is high, the output of the NOR gate 21 is low.

Since Q1 has to be high when the pel m,n (see FIG. 1) is to be printed, $\overline{Q1}$ is low. When both of the inputs to the NOR gate 23 (see FIG. 2) are low (This is when the pel m,n (see FIG. 1) is to be printed and boosted.), the NOR gate 23 will have a high output. Therefore, the output of the comparator 22 is high whenever any of the Q2, DN', and DL signals is low since this indicates that one of the pel m,n−1, the pel m,n+1, and the pel m−1,n did not or will not have the corresponding electrode 11 (see FIG. 4) energized.

The output of the comparator 22 (see FIG. 2) is supplied to an AND gate 28 having the BUILD signal as its other input. When the output of the comparator 22 is high to indicate that boost power is desired to be applied to the electrode 11 (see FIG. 4) for the pel m,n (see FIG. 1), the high from the AND gate 28 (see FIG. 2) is supplied as boost data through an OR gate 29 to a forty bit shift register 30, which is the head driver shift register.

The forty bit shift register 30 is clocked by a PCLOCK signal supplied thereto over a line 31 from an OR gate 32. When the BUILD signal is up, the PCLOCK pulses are produced from an AND gate 33 having the BUILD signal and CD, a delayed clock pulse one-half of the clock period later than the clock pulse C, as its inputs. The delayed clock pulse CD is necessary to delay the flow of the boost data into the shift register 30 until the DN' signal has been clocked into the shift registers 16 and 20 and the Q40 signal has been stored in the store latch 19.

It should be understood that it is not necessary for the clock pulses C and the delayed clock pulses CD to be continuous trains of pulses. It is only required that there be a total of forty pairs of pulses corresponding to the forty pels of a column with each pair of a clock pulse, C and a delayed clock pulse CD being available to shift the boost data into the shift register 30 during the print portion of the cycle. Thus, each pair of the clock pulse C and the delayed clock pulse CD could occur at random as long as all forty pairs occur prior to completion of the print portion of the cycle.

Accordingly, each output from the AND gate 28 is supplied serially as the boost data to the head driver shift register 30 under control of the PCLOCK signal. When the boost data is supplied, the PCLOCK signal is the CD clock signal.

After the forty bits representing a column such as the column m, for example, in the character box 10 (see FIG. 1) has been entered in the head driver shift register 30 (see FIG. 2) as the boost data, a PSTROBE signal (see FIG. 3) is supplied to activate forty latches 34 (see FIG. 2) so that all forty bits in the shift register 30 are transferred in parallel to the latches 34. The latches 34 having a high signal supplied thereto from the shift register 30 activate corresponding output drivers 35 when a PSTOP signal (see FIG. 3) is supplied to each of the drivers 35 (see FIG. 2). Each of the drivers 35 corresponds to one of the forty electrodes 11 (see FIG. 1), which are identified as EL1-EL40 in FIG. 2.

Figure 3:
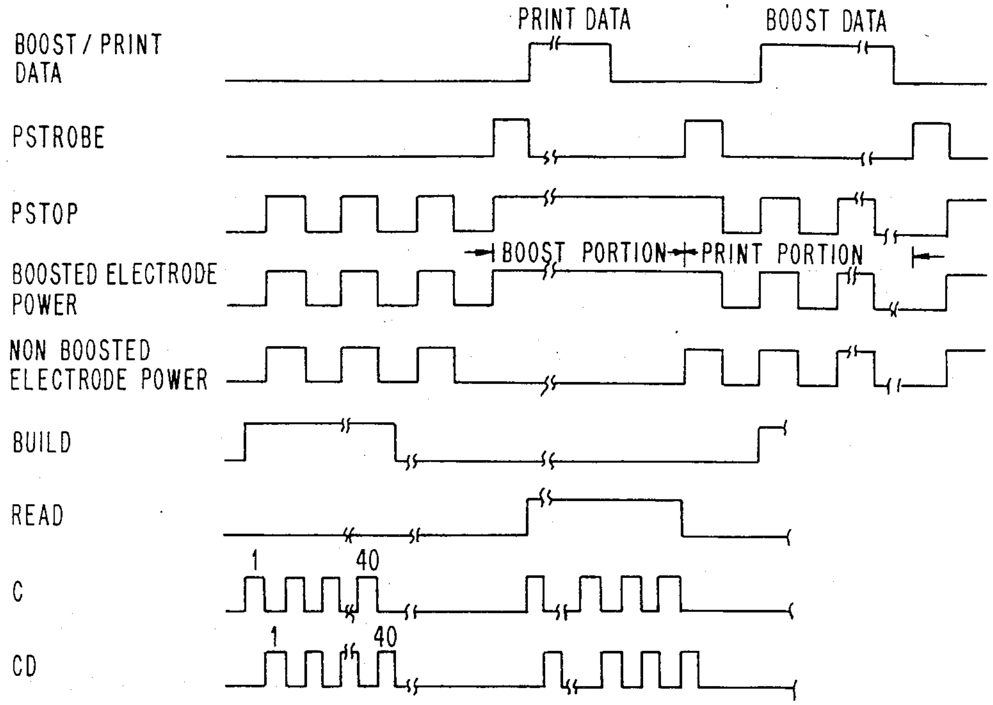
FIG. 3 is a timing diagram showing the relationship of various signals used with the system of FIG. 2.

As shown in FIG. 3, the PSTOP signal goes up during the boost portion of a cycle at the same time that the PSTROBE goes up and stays up until the next PSTROBE signal goes down. During the boost portion of the cycle, the PSTOP signal is 100% modulated so that power is applied during the entire, 127.8 microseconds of the boost portion of the cycle.

The BUILD signal goes down no later than when the PSTROBE signal goes up to transfer the boost data, which was supplied from the AND gate 28 (see FIG. 2) to the shift register 30, from the shift register 30 to the latches 34. The BUILD signal goes down when the fortieth delayed clock pulse CD goes low. When the PSTROBE signal goes down after being up, the latches 34 remain in the state in which they were placed by the inputs from the shift register 30.

At the time of the PSTROBE signal going down, a READ signal goes up. The READ signal will remain up until the next PSTROBE signal goes up. The READ signal and the BUILD signal can both be down at the same time as shown in FIG. 3 since the BUILD signal goes low when the fortieth delay clock pulse CD goes down.

With the READ signal up, each output from the shift register 16 (see FIG. 2) is supplied through an AND gate 36, which has the READ signal as its other input, as print data to the OR gate 29. The PCLOCK signal on the line 31 clocks each of the bits from the shift register 16 into the, shift register 30 in serial fashion.

During transfer of the print data from the shift register 16 to the shift register 30, the PCLOCK signal is the output of an AND gate 37. The AND gate 37 has the READ signal and the clock pulse C as its two inputs so that the PCLOCK is the same as the clock pulse C at this time.

As shown in FIG. 3, the print data is transferred to the shift register 30 (see FIG. 2) during the boost portion of the cycle. This is because it is necessary to have the print data in the shift register 30 at the time that the print portion of the cycle is to start.

Each bit from the output of the shift register 16 also is supplied through an AND gate 38 to the OR gate 18 for return to the input of the shift register 16.

Therefore, when the READ signal is high and this is when the print data is being transferred from the shift register 16 to the shift register 30, each of the forty bits in the shift register 16 is recirculated to the input of the shift register 16.

Each of these output signals of the shift register 16 also is supplied to the comparator 22 through the store latch 19. However, the output of the comparator 22 is ineffective during transfer of the print data to the shift register 30 because the AND gate 28 has a low BUILD signal as one of its two inputs.

After the print data has been transferred to the shift register 30, the second PSTROBE signal of a cycle is applied to the forty bit latches 34 to transfer the forty bits in the shift register 30 in parallel to the latches 34. This starts the print portion of the cycle.

The PSTOP signal to the drivers 35 is modulated during the print portion of the cycle so that the maximum period of time for each of the electrodes EL1--EL40 to be energized for each pulse of the PSTOP, as shown in FIG. 3, is 42.6 microseconds at 100% duty cycle.

During the print portion of the cycle, the decoded font data from the shift register 15 (see FIG. 2) is supplied as an output through the AND gate 17 to the input of the shift register 16. Thus, the retained forty bits in the shift register 16 representing the forty electrodes EL1-EL40 that are being printed during the print portion of the cycle will be compared to the new data to determine which of the electrodes EL1-EL40 should be activated during the boost portion of the next cycle.

It should be understood that the two bit shift register 20 has both stages set to zero through a ZERO SET signal at the start of each column. This indicates that there is no pel above the first pel in the column. Therefore, the power in the electrode 11 (see FIG. 4) for the first pel in any column is boosted when the first pel in any column is to be printed.

Figure 6:
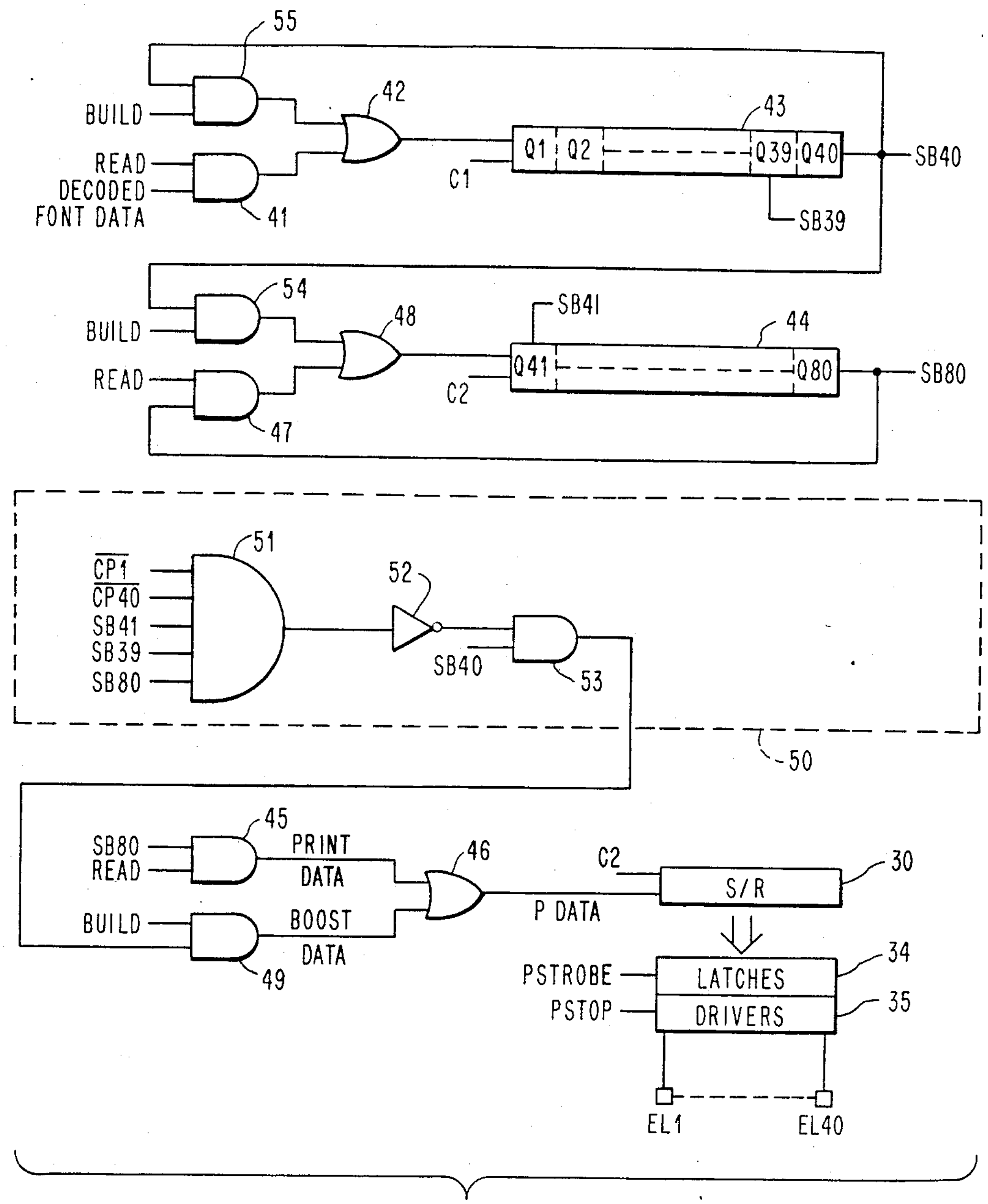
FIG. 6 is a schematic block diagram of another system for controlling the power supply to each electrode of the thermal printer.

Referring to FIG. 6, there is shown another system for selectively energizing the electrodes EL1–EL40 during the print portion of a cycle or the print and boost portions of a cycle. Decoded font data, which is compressed, for a character to be produced within a character box 40 (see FIG. 7) is supplied as one input to an AND gate 41 (see FIG. 6) having a READ signal as its other input.

When the READ signal is high, the AND gate 41 will supply the decoded font data as the input to an OR gate 42. The output of the OR gate 42 is supplied as an input to a forty bit shift register 43 under control of a clock pulse C1. As shown in FIG. 6, the forty bits in the shift register 43 are Q1–Q40 and correspond to the forty pels in a column m of the character box 40 (see FIG. 7).

A forty bit shift register 44 has its output SB80 supplied as one input to an AND gate 45. The other input to the AND gate 45 is the READ signal. Therefore, when the decoded font data is serially supplied to the shift register 43 with the READ signal up, the shift register 44 has its Q41–Q80 bits serially supplied as the output of the AND gate 45 under control of a clock pulse C2. Thus, the output of the AND gate 45, with the READ signal up, is the state of each of the bits Q41–Q80 supplied from the shift register 44 under the control of forty of the clock pulses C2.

Figure 7:
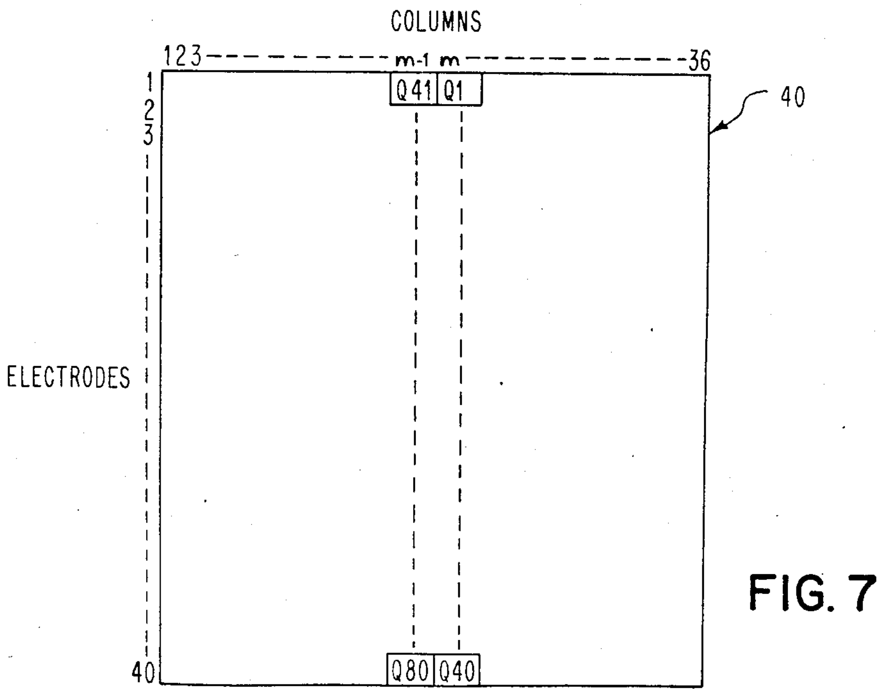
FIG. 7 is a schematic view of a character box showing the relation of signals generated in the system of FIG. 6 for two columns of the character box.

The clock pulses C2 are produced at a fixed rate while the clock pulses C1 can be produced at random when the READ signal is up to bring the decoded font data into the shift register 43 at random times when the READ signal is high. As shown in FIG. 7, the Q41–Q80 bits are deemed to correspond to the forty pels in a column $m-1$ of the character box 40.

The output of the AND gate 45 (see FIG. 6) is connected through an OR gate 46 to the input of the shift register 30. This shifting of the print data into the shift register 30 occurs during printing of the boost data.

During the time that the Q41–Q80 bits are supplied to the shift register 30, they also are recirculated to the input of the shift register 44 through an AND gate 47. This is because the AND gate 47 has the high READ signal as its other input at this time. The output of the AND gate 47 is supplied, through an OR gate 48 to the shift register 44.

At completion of the transfer of the print data from the shift register 44 through the AND gate 45 to the shift register 30, the shift register 43 has the Q1–Q40 bits corresponding to the forty pels in the column m of the character box 40 (see FIG. 7) and the shift register 44 (see FIG. 6) has the Q41–Q80 bits corresponding to the forty pels in the column $m-1$ of the character box 40 (see FIG. 7). The Q41–Q80 bits also are in the shift register 30 (see FIG. 6).

Figure 8:
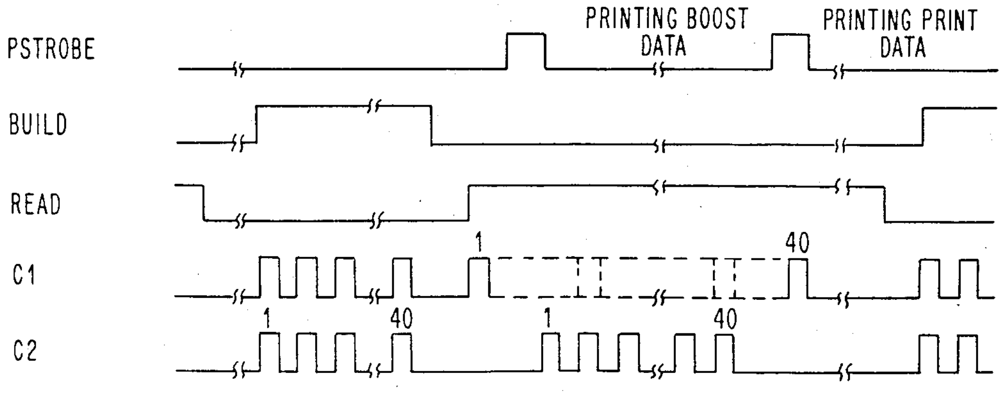
FIG. 8 is a timing diagram showing the relationship of various signals used with the system of FIG. 6.

After forty of the clock pulses C2 are produced, production of the clock pulses C2 is stopped until the BUILD signal goes up as shown in FIG. 8. This prevents any further shifting of the signals in the shift register 44 (see FIG. 6).

When the BUILD signal goes up, the clock pulses C1 and C2 are produced in synchronization as shown in FIG. 8. With the BUILD signal up, an AND gate 49 (see FIG. 6) supplies the boost data as its output through the OR gate 46 to the shift register 30. Whether the boost data has a high for a specific pel depends upon whether any of the two contiguous pels to the specific pel in the same column or the same pel in the prior column has been printed. If any one of these three pels has not been printed, this means that the pel will form a leadrng or vertical edge of a character, and the AND gate 49 provides a high as its output for the specific output signal SB40 of the shift register 43.

The comparison of the conditions of the various signals representing various pels is made in a comparator 50. The comparator 50 includes an AND gate 51 having five inputs, which are $\overline{CP1}$, $\overline{CP40}$, SB39, SB41, and SB80. With the shift register 44 having the Q41–Q80 signals and the shift register 43 having the Q1–Q40 signals arranged therein as shown in FIG. 6 at a specific instance, the SB80 signal is the Q80 bit at the specific instance and corresponds to the pel in the same position in the column $m-1$ of the character box 40 (see FIG. 7) and the SB39 (see FIG. 6) signal is the Q39 bit at the specific instance and corresponds to the pel in the column m (see FIG. 7) above the pel corresponding to the bit Q40. The SB41 (see FIG. 6) signal is the Q41 bit at the specific instance and corresponds to the bit preceding the Q40 bit and is in the prior column $m-1$ of the character box 40 in the example shown in FIG. 7. Of course, there is continuous shifting of the bits in the shift registers 43 (see FIG. 6) and 44, and this is just one example with the fortieth pel in the column m(see FIG. 7) being the one to be printed and for which the comparison is being made in the specific example.

Because the Q41 bit has no effect on the Q40 bit since they are in different columns as shown in FIG. 7, the third contiguous position, at this time, is defined by the $\overline{CP40}$ (see FIG. 6) signal being low. This occurs only when the SB40 signal is the Q40 signal representing the bottom pel in a column of the character box 40 (see FIG. 7).

Similarly, when the SB40 (see FIG. 6) signal is the Q1 bit corresponding to the top of the column m(see FIG. 7) of the character box 40, the $\overline{CP1}$ (see FIG. 6) signal will be low. This is because there is no printing above the first pel in a column.

Accordingly, whenever determination is made as to whether the top or bottom pel of a column is to be boosted, the output of the AND gate 51 will always be low. This is because these two pels constitute vertical edges of any horizontal line of a character when they are used for printing.

The output of the AND gate 51 is inverted by an inverter 52 and supplied as one input to an AND gate 53. The other input to the AND gate 53 is the SB40 signal from the shift register 43. Thus, if the SB40 output signal from the shift register 43 is high to indicate that the pel represented by it at the specific instance is to be printed, the output of the AND gate 53 is high whenever the output of the AND gate 51 is low.

Accordingly, whenever the upper pel or the lower pel in a column is to be printed, a high will always be supplied from the AND gate 53 to the AND gate 49. With the BUILD signal up, the boost signal is supplied through the OR gate 46 to the shift register 30.

For any other of the pels except the top or bottom pels, each of the $\overline{CP1}$ and $\overline{CP40}$ and signals is high. At this time, the SB41 signal, which corresponds to the first bit in the shift register 44, is the signal corresponding to the pel following the pel for which the boost is being determined and the SB39 signal is for the pel prior to the pel being considered. The SB80 signal, which is the output from the shift register 44, represents the corresponding pel in the prior column to the pel being considered as can be observed from FIG. 7. Accordingly, if any of the the SB39 (see FIG. 6), the SB41, and the SB80 signals is low (This indicates that the corresponding pel is not to print.), the comparator 50 will supply a high to the AND gate 49 if the pel, which is represented by the SB40 output signal from the shift register 43, is to be printed.

During the time that the boost data is being transferred to the shift register 30, printing of the print data is occurring during this print portion of a cycle. This is in the same manner as described for the system of FIG. 2.

When the boost data is being transferred to the shift register 30 from the shift register 44, the output from the shift register 43 is transferred as an input to the shift register 44 through an AND gate 54, which has the BUILD signal as its other input. With the BUILD signal up during this time the forty bits in the shift register 43 are transferred to the shift register 44 at this time.

The shifting of the bits from the shift register 43 to the shift register 44 during the time when the boost data is being supplied to the shift register 30 provides the print data that is to be supplied from the shift register 44 to the shift register 30 when the boost data is used for printing. Thus, when the READ signal next goes up, the Q41–Q80 bits in the shift register 44 are transferred to the shift register 30 as previously described.

The output from the shift register 43 also is recirculated to its input through an AND gate 55 at this time. The other input to the AND gate 55 is the BUILD signal so that the output from the shift register 43 is recirculated to the input under control of the clock pulses C1, which are synchronized with the clock pulses C2 when the BUILD signal is high as shown in FIG. 8.

Figure 9:
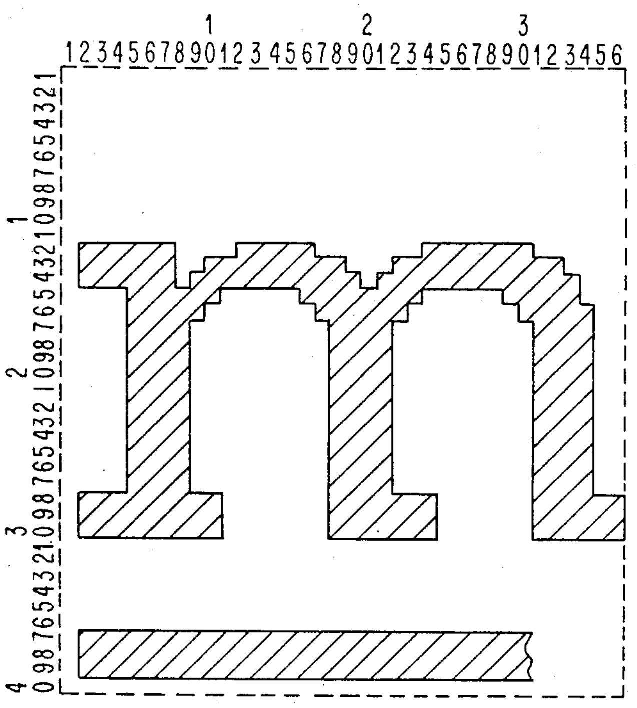
FIG. 9 is a schematic view of a character box showing a character m and part of an underscore.

One example of a character produced by the system of FIG. 2 or 6 with an underscore partially shown is disclosed in FIG. 9. This has the various edges to which the power is increased.

An advantage of this invention is that it increases the power at the leading edge and/or vertical edge of a printed character. A further advantage of this invention is that it improves the print quality of a thermal printer.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A thermal printing apparatus including:

a thermal transfer medium;

a plurality of thermal print elements arranged in a column for cooperation with said thermal transfer medium to print a character from said thermal transfer medium by relative movement between said thermal transfer medium and said thermal print elements and selective activation of said thermal print elements during each of a plurality of cycles;

selecting means to selectively activate each of said thermal print elements during each cycle in accordance with a character to be printed;

power applying means to apply power to each of said thermal print elements selected by said selecting means during each cycle for printing through cooperation with said thermal transfer medium;

power increasing means to increase the power applied by said power applying means during each cycle to any of said selected thermal print elements unless said selected thermal print element was selected by said selecting means in the prior cycle of activation of said thermal print elements and each of said thermal print elements adjacent said selected print element is selected by said selecting means for activation in the same cycle;

and said power increasing means including means to cause said power applying means to apply power to said selected thermal print elements for a period of time during each cycle prior to the period of time during each cycle when said power applying means applies power to said thermal print elements selected by said selecting means.

2. The apparatus according to claim 1 in which said thermal transfer medium is a resistive ribbon.

3. A thermal printing apparatus including:

a thermal transfer medium;

a plurality of thermal print elements arranged in a column for cooperation with said thermal transfer medium to print a character from said thermal transfer medium by relative movement between said thermal transfer medium and said thermal print elements and selective activation of said thermal print elements during each of a plurality of cycles;

first storage means to store data concerning the state of each of said thermal print elements as to activation during at least the preceding cycle;

comparing means to compare the data for each of said thermal print elements as to activation in the present cycle with the data for said thermal print elements contiguous thereto as to activation in the present cycle and the stored data in said first storage means from the preceding cycle for the same of said thermal print elements;

second storage means to receive data from said comparing means for each of said thermal print elements to cause activation in one portion of the present cycle of each of said thermal print elements that is to be activated during another portion of the present cycle unless the specific one of said thermal print elements was activated in the prior cycle and each of said thermal print elements contiguous to the specific one of said thermal print elements is to be activated in the present cycle;

means to apply power during the one portion of the present cycle to each of said thermal print elements that is to be activated during the one portion of the present cycle in accordance with the data in said second storage means;

said first storage means storing data as to the state of each of said thermal print elements as to activation during the another portion of the present cycle;

means to transfer the data in said first storage means to said second storage means prior to application of power by said power applying means during the another portion of the present cycle;

and said power applying means applying power to each of said thermal print elements during the another portion of the present cycle in accordance with the data in said second storage means.

4. The apparatus according to claim 3 including means to cause said first storage means to retain the data concerning the state of each of said thermal print elements as to activation during the another portion of the present cycle until the next cycle.

5. The apparatus according to claim 4 in which said thermal transfer medium is a resistive ribbon.

6. A thermal printing apparatus including:

a thermal transfer medium;

a plurality of thermal print elements arranged in a column;

means to selectively activate said thermal print elements to print a character from said thermal transfer medium through applying power to said thermal transfer medium;

control means to control said selectively activation means during each of two time periods of each cycle;

and means to cause said control means to control said selectively activation means to activate one of said thermal print elements during one of the two time periods when said one thermal print element is to be activated during the other of the two time periods of the cycle unless each of the two adjacent of said thermal print elements is to be activated during the other time period of the cycle and said one thermal print element was not activated during the prior cycle.

7. The apparatus according to claim 6 in which:

the one time period of each cycle is the first time period;

and the other time period of each cycle is the second time period.

8. The apparatus according to claim 7 in which the first and second time periods of each cycle are continuous.

9. The apparatus according to claim 8 in which at least two contiguous of said thermal print elements are required to form substantially all horizontal and vertical lines of a character to be printed.

10. The apparatus according to claim 6 in which at least two contiguous of said thermal print elements are required to form substantially all horizontal and vertical lines of a character to be printed.

11. The apparatus according to claim 10 in which said thermal transfer medium is a resistive ribbon.

12. A thermal printing apparatus including:

a resistive ribbon;

a plurality of electrodes arranged in a column for cooperation with said resistive ribbon to print a character from said resistive ribbon in which substantially all horizontal and vertical lines of each character are formed by activating at least two contiguous of said electrodes, each character being printed by relative movement between said resistive ribbon and said electrodes and selective activation of said electrodes during each of a plurality of cycles;

data examining means to examine data defining a character to be printed and to designate pels corresponding to activation information for individual ones of said electrodes which are to be activated for printing while the pel in the previous, next adjacent column corresponding to the same of said electrodes is not to be activated for printing;

first driving means to drive said electrodes at the designated pels at one level of activation;

and second driving means to drive said electrodes at the designated pels at a second, lower level of activation for at least the pels in the next two adjacent columns corresponding to the same of said electrodes for which the data defining a character designates electrode activation except for such pels constituting an edge of the character being printed.

13. The apparatus according to claim 12 in which:

said data examining means includes designating means to designate pels corresponding to activation information for individual ones of said electrodes which are to be activated while one of the two contiguous pels in the same column is not to be activated for printing;

and said first driving means drives said electrodes at the designated pels at the one level of activation.

14. The apparatus according to claim 13 in which said first driving means drives said electrode at the top of the column or said electrode at the bottom of the column at the one level of activation irrespective of the activation of said electrode contiguous thereto when said electrode at the top of the column or said electrode at the bottom of the column is to be driven.

15. A thermal printing apparatus including:

a column of thermal print elements for printing pels having a vertical dimension less than 1/200" and a horizontal dimension less than 1/300";

data examining means to examine data defining a character to be printed and to designate pels corresponding to activation information for individual ones of said thermal print elements which are to be activated for printing while the pel in the previous, next adjacent column is not to be activated for printing;

first driving means to drive said thermal print elements at the designated pels at one level of activation;

and second driving means to drive said thermal print elements at the designated pels at a second, lower level of activation for at least the pels in the next two adjacent columns corresponding to the same of said thermal print elements for which the data defining a character designates thermal print element activation except for such pels constituting an edge of the character being printed.

16. The apparatus according to claim 15 in which:

said dâta examining means includes designating means to designate pels corresponding to activation information for individual ones of said thermal print elements which are to be activated while one of the two contiguous pels in the same column is not to be activated for printing;

and said first driving means drives said thermal print elements at the designated pels at the one level of activation.

17. The apparatus according to claim 16 in which said first driving means drives said thermal print element at the top of the column or said thermal print element at the bottom of the column at the one level of activation irrespective of the activation of said thermal print element contiguous thereto when said thermal print element at the top of the column or said thermal print element at the bottom of the column is to be driven.

* * * * *